United States Patent [19]

Brzezinski

[11] 4,262,659
[45] Apr. 21, 1981

[54] SOLAR RADIATION ABSORBING PANEL

[75] Inventor: Joseph Brzezinski, Franklin, Ohio

[73] Assignee: Valley Industries, Inc., Cincinnati, Ohio

[21] Appl. No.: 114,966

[22] Filed: Jan. 24, 1980

[51] Int. Cl.³ .............................................. F24J 3/02
[52] U.S. Cl. ................................. 126/449; 126/445; 165/170
[58] Field of Search ............... 126/449, 444, 445, 448, 126/441, 446; 165/166, 170, 181, 183, 185; 29/157.3 V

[56] References Cited

U.S. PATENT DOCUMENTS

| | | | |
|---|---|---|---|
| 2,480,706 | 8/1949 | Brinen | 126/446 |
| 3,265,127 | 8/1966 | Nickol et al. | 165/152 |
| 3,611,534 | 10/1971 | Keith | 29/157.3 V |
| 3,863,621 | 2/1975 | Schoenfelder | 126/449 |
| 3,905,850 | 9/1975 | Darm | 165/166 |
| 4,002,200 | 1/1977 | Raskin | 165/170 |
| 4,016,861 | 4/1977 | Taylor | 165/166 |
| 4,019,494 | 4/1977 | Safdari | 126/449 |
| 4,078,548 | 3/1978 | Kapany | 126/449 |
| 4,090,494 | 5/1978 | Borst | 126/450 |
| 4,154,222 | 5/1979 | Yu | 126/449 |

Primary Examiner—Daniel J. O'Connor
Attorney, Agent, or Firm—Frost & Jacobs

[57] ABSTRACT

A solar radiation absorbing panel including a flat base sheet of solar radiation absorptive material having a plurality of spaced sinuously shaped series of individual rectangular tab members extending away from the upper surface of the base sheet. Each of the tab members is formed by severing the sheet along a continuous line leaving a portion of the base sheet attached between the ends of the severed lines, and bending the tab member along the attached portion away from the surface of the panel, leaving an opening in the base sheet such that the spaces between the tab members form fluid passageways for directing fluid from the panel inlet to the panel outlet. The panel may also be provided with support sheet underlying the base sheet to block the openings to prevent fluid flow therethrough. The panel may be fabricated in a single stamping and bending operation, thereby eliminating separate fabrication steps associated with conventional solar radiation absorbing panels.

34 Claims, 9 Drawing Figures

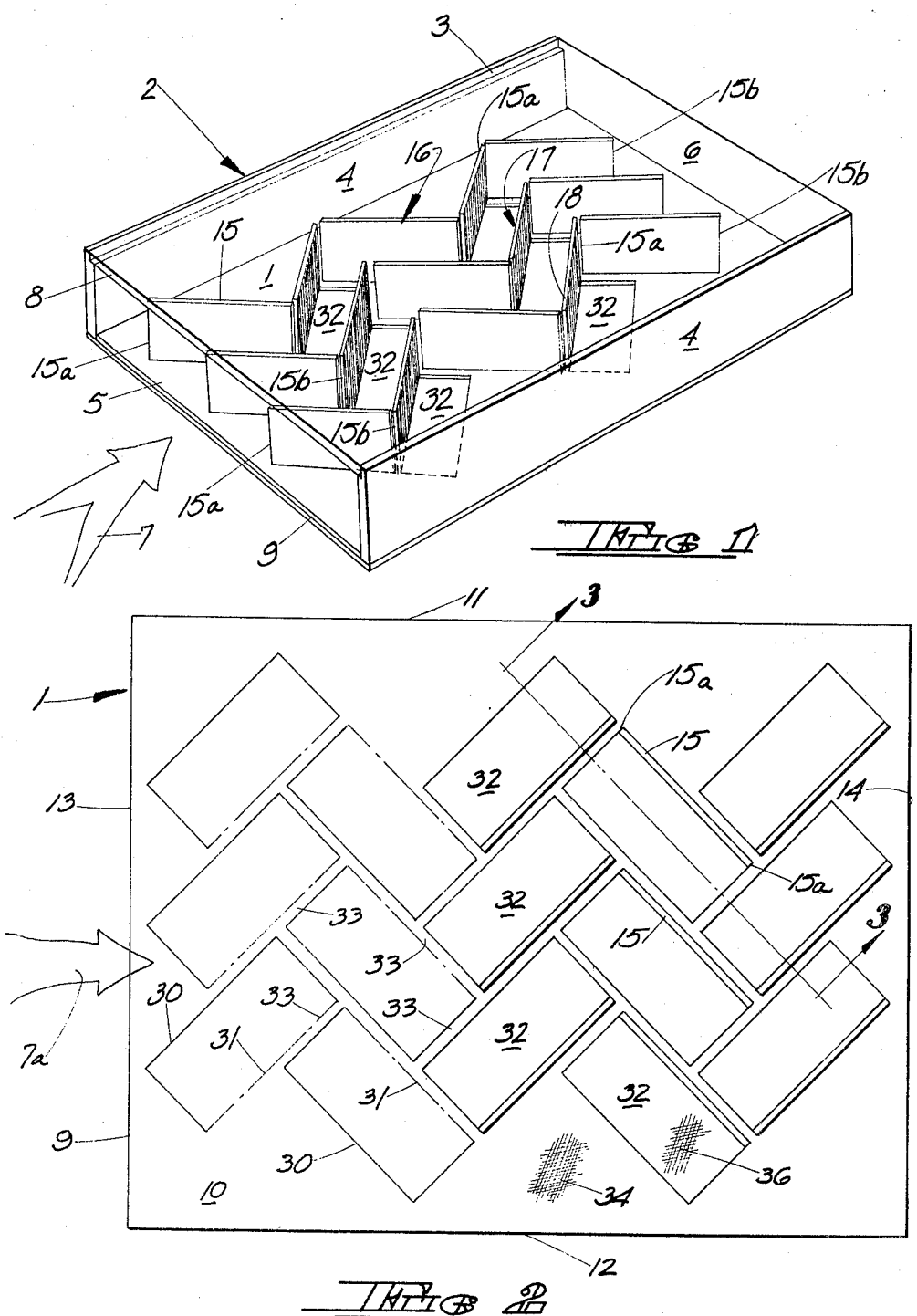

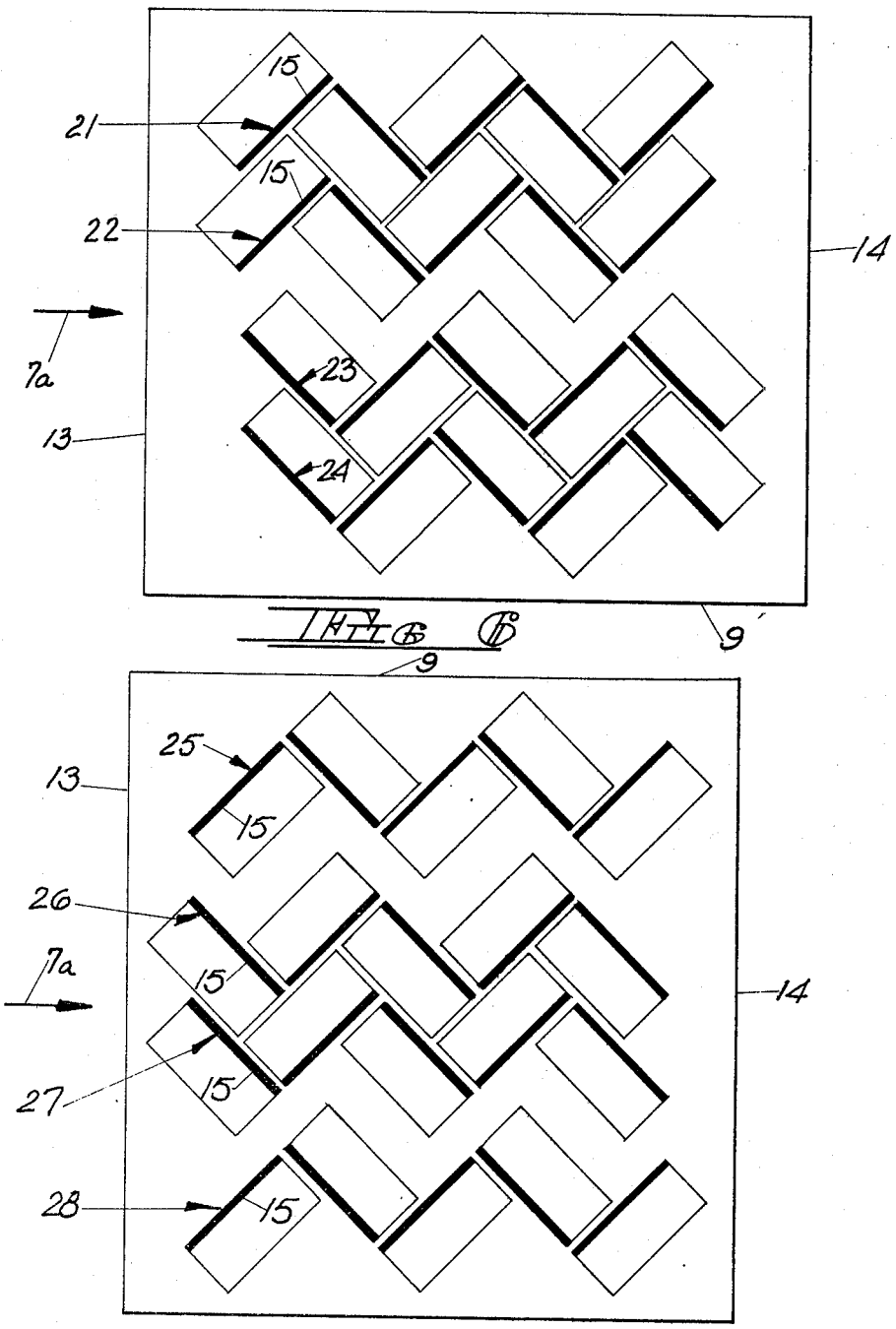

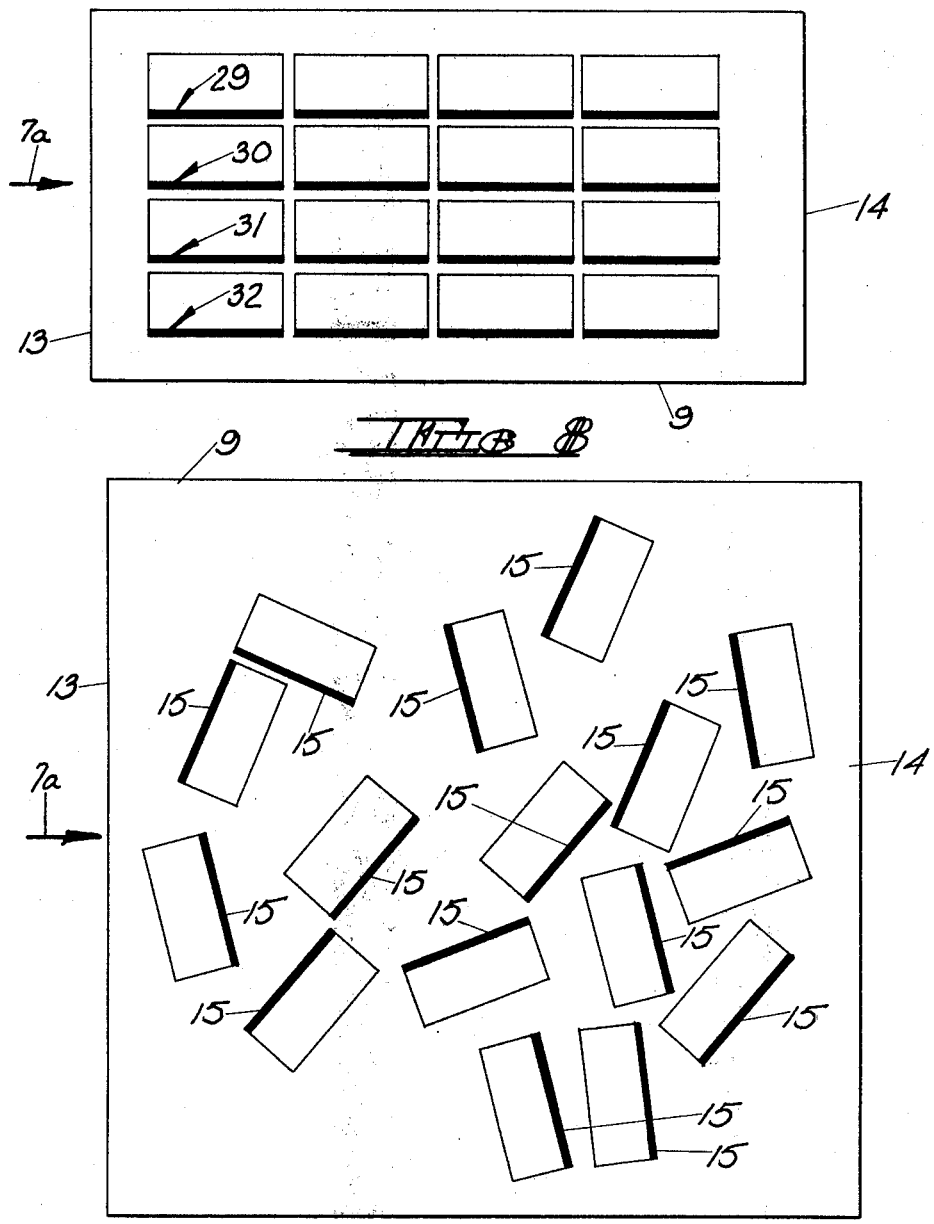

4,262,659

SOLAR RADIATION ABSORBING PANEL

SUMMARY OF THE INVENTION

There are numerous concepts for the collection of solar radiation. These concepts range from the most simple—a window—to those that are quite complex and require advanced technology for their development, such as solar cells, for instance.

Of the many heat collection concepts presently being developed, the relatively simple flat-plate collector has found the widest application. Its low fabrication, installation and maintenance cost, as compared to higher temperature heat collection shapes, has been the primary reason for its widespread use. Additionally, flat-plate collectors can be easily incorporated into a building shape, provided the tilt and orientation are properly calculated.

As is well known in the art, a flat-plate collector generally consists of a solar radiation absorbing plate or panel, often metallic, which may be flat, corrugated or grooved. The plate may be painted black, or provided with other absorptivity increasing coatings, to increase absorption of the sun's heat. In general, such collectors are covered with a solar radiation transmissive cover sheet to trap heat within the collector and reduce convective cooling of the absorber. The captured solar heat is removed from the absorber by means of a working fluid, generally air or water, which is heated as it passes through or near the radiation absorbing plate. The heated working fluid is then transported to points of use or to storage depending on energy demand.

It has been found that the collection efficiency of such solar collectors can be significantly improved by providing the radiation absorbing panel or plate with a plurality of continuous upstanding fins arranged in spaced relationship so as to form fluid passageways extending between the solar panel inlet and outlet. Generally, the continuous fins are positioned normal to the absorbing plate such that solar rays reflected from a particular absorptive surface area on the fins or the absorbing plate will be absorbed by other surface areas, thereby preventing reflection of the solar radiation through the solar radiation transmissive cover. Furthermore, the fins tend to act as turbulators increasing turbulance of the fluid and thereby increasing the effectiveness of heat transfer from the panel surfaces to the working fluid. A novel arrangement for such continuous fins is illustrated in my co-pending application Ser. No. 06/031,227, filed Apr. 18, 1979 and entitled Solar Heat Collecting Unit For Forced Air Systems. In the preferred embodiment described therein, the upstanding sinuous parallel spaced fins are provided with a number of tabs projecting downwardly at spaced locations from the lower edge of the fins, which cooperate with similarly spaced slots in the absorptive plate to provide means for attaching the fins to the plate. In other embodiments, the fins are resistance welded to the supporting absorptive plate. In either event, these methods of construction require that the fins and plate be separately fabricated, and that an additional fabrication step be required to join the fins and plate together, significantly decreasing the cost effectiveness of such flat-plate collectors.

The present invention is directed to a solar radiation absorbing panel for use with a fluid heating solar collector of the type described above including an absorbing plate having means projecting upwardly from the upper surface of the panel to increase the collecting efficiency of the solar collector and for forming air passageways for directing fluid from the inlet to the outlet. The resulting panel is constructed in such a manner as to eliminate the separate fabrication step of attaching the fins to the underlying plate inherent in prior art solar radiation absorbing panels. In a preferred embodiment, the panel comprises a substantially flat plate-like rectangular sheet of solar radiation absorptive material, which may be provided with additional solar radiation absorption enhancing coatings, bounded by spaced side and end edges, the end edges forming the fluid inlet and outlet, respectively, of the panel.

Means project upwardly from the upper surface of the panel for forming a plurality of parallel sinuous air passageways for directing the working fluid from the inlet to the outlet. In a preferred embodiment, these means are formed by a plurality of individually formed tab members extending upwardly from the upper surface of the panel. Each rectangular-shaped tab member is formed by making a C-shaped cut in the panel, leaving one edge of the tab member attached to the panel. The tab member is then bent upwardly to a vertical position such that the tab member is directed generally from the inlet edge of the panel toward one of the side edges at a 45° angle with respect to the inlet edge.

A second tab member is formed in a similar manner such that the adjacent edges of the first and second tab members are substantially perpendicular. Additional tab members are similarly formed to create a zig-zag-shaped series of tab members extending generally between the inlet and outlet of the panel.

A similar series of tab members is formed in staggered spaced parallel relationship with the first set of tab members to form a zig-zag-shape or sinuous air passageway extending between the inlet and outlet of the panel. Additional parallel air passageways may be formed in a similar manner, as required, by merely forming additional series of adjacent tab members.

A substantially flat rectangular plate-like sheet of solar radiation absorptive material may be positioned beneath the panel containing the upstanding tab members to block or cover the rectangular-shaped openings formed by the upstanding tab members. The entire unit may be positioned within a box-like enclosure and covered with a solar radiation transmissive sheet to form the completed solar collector, as it is well understood in the art.

It will be observed that this method of manufacture eliminates the separate fabrication steps required by conventional solar radiation absorbing panels where individual sinuously-snaped continuous fins must be individually attached by welding, soldering or other means to the underlying base sheet. In the present invention, the upstanding tab members may be rapidly and easily formed by a single stamping and bending operation, or by consecutive stamping and bending operations.

Further features of the invention will become apparent from the detailed description which follows:

BRIEF DESCRIPTION OF THE DRAWING

FIG. 1 is a perspective view of a solar collector utilizing the solar radiation absorbing panel of the present invention.

FIG. 2 is a top elevation view of a partially completed panel of the present invention.

FIG. 6 is a top plan view of another embodiment illustrating an alternate tab member configuration.

FIG. 7 is a top plan view of another embodiment illustrating an alternate tab member configuration.

FIG. 8 is a top plan view of another embodiment illustrating an alternate tab member configuration.

FIG. 9 is a top plan view of another embodiment illustrating an alternate tab member configuration.

DETAILED DESCRIPTION

Figure 3:
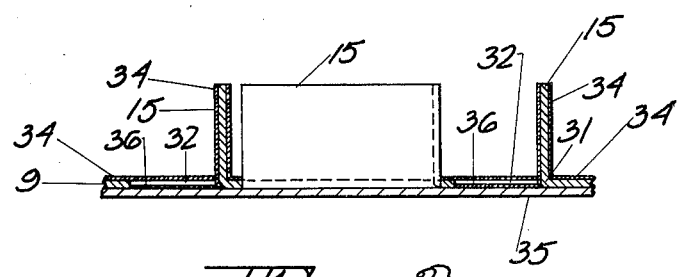
FIG. 3 is a fragmentary cross sectional view taken along section line 3—3 of FIG. 2.

The solar radiation absorbing panel of the present invention, shown generally at 1, is illustrated in FIG. 1 in connection with a typical flat plate solar collector shown generally at 2. As is well known in the art, such flat-plate solar collectors generally include a box-like housing 3 having spaced parallel side walls 4 and spaced parallel end walls 5 and 6. End wall 5 generally forms a fluid inlet for admitting a working fluid, such as air, water or the like, into collector 2 in the direction illustrated by directional arrow 7. Similarly, end wall 6 forms an outlet for exhausting heated working fluid from the collector. A sheet 8 of solar radiation transmissive material such as glass, plastic or the like, is positioned on the upper surface of collector 2 overlying panel 1 to admit solar radiation into the collector.

In the embodiment of the invention illustrated in FIG. 1–FIG. 3, panel 1 comprises a substantially flat plate-like base sheet 9 having a substantially planar upper surface 10 bounded by spaced side edges 11 and 12, and spaced end edges 13 and 14. End edge 13 forms the fluid inlet end of panel 1 as illustrated diagrammatically by direction arrow 7a, while end edge 14 forms the fluid outlet end of panel 1. In the preferred embodiment illustrated, base sheet 9 may be rectangular in shape, and constructed of a solar radiation absorptive material such as aluminum, steel or the like, and may also be provided with solar radiation absorption enhancing coating as will be described in more detail hereinafter. It is preferred that relatively light gauge material be utilized for panel 1 in order to provide faster response to direct or diffuse sunlight, and consequently higher heat absorption, especially on cloudy days.

Panel 1 is provided with means projecting away from surface 10 of base sheet 9 for forming one or more fluid passageways for directing fluid from inlet edge 13 to outlet edge 14. These means include a plurality of individual rectangular tab members 15 extending perpendicularly away from surface 10 of base sheet 9. In a preferred embodiment, tab members 15 are of substantially the same size and shape, and dimensioned to extend from surface 10 of base sheet 9 to slightly beneath the lower surface of collector cover 8. This construction limits the amount of fluid passing between the upper edges of tab members 15 and the lower surface of the cover, and restricts the flow of fluid through collector 2 to the fluid passageways formed between the sinuous-shaped series of tab members 15 placed in end-to-end relationship.

As best shown in FIG. 1, each tab member includes a pair of substantially vertical spaced edges 15a and 15b, extending away from the upper surface 10 of base sheet 9. The panel further includes a first series of tab members, shown generally at 16, consisting of a plurality of individual tab members 15 arranged in end-to-end relationship, which extends generally between inlet edge 13 and outlet edge 14 of panel 1. In other words, the individual tab members 14 are arranged to form the sinuously-shaped series of tab members by positioning the tab members perpendicularly to each other such that adjacent vertical edges are substantially parallel but not contiguous, thereby forming a zig-zag-shape of adjoining tab elements extending between the inlet and outlet of collector 2. A second series of tab members 17 is similarly formed by individual tab members 15 arranged in end-to-end relationship, such that the spacing between the first series of tab members 16 and the second series of tab members 17 is substantially constant, with the space between the parallel series of tab members forming a fluid passageway extending between the collector inlet and outlet. If desired, a third series of tab members 18 may also be formed of individual tab members 15 placed in end-to-end realtionship, with the third series being positioned in spaced relationship with the second series of tab members 17, thereby forming spaced parallel fluid passageways formed by the spaced parallel sinuously-shaped series of tab members.

It will be observed in this arrangement that each tab member 15 is arranged at an angle of approximately 45° with respect to inlet edge 13, and is oriented generally to lie along a line extending between inlet edge 13 and outlet edge 14, or in other words along a line extending between inlet edge 13 and one or the other of side edges 11 or 12. It will further be observed that the opposing tab elements 15 of each series are arranged in staggered relationship by approximately one half their length. In other words, a tab element 15 begins at approximately the midpoint of the opposing tab element.

Figure 4:
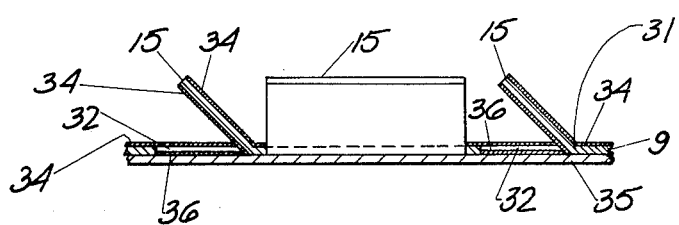
FIG. 4 is a fragmentary cross sectional view taken through the panel of the present invention illustrating angularly disposed tab members.

As best shown in FIG. 3, tab members 15 are substantially perpendicular to the upper surface 10 of base sheet 9. However, it is also considered to be within the scope of the present invention to angularly dispose tab members 15 with respect to surface 10 of base sheet 9 as illustrated in FIG. 4. In either event, the tab members provide additional collector surface area for collecting solar radiation reflected within the collector and prevent reflection of solar radiation through the collector cover, as well as act as turbulators to introduce turbulance into the fluid stream passing among the tab members to effectively remove heat from the tab members or surface 10 of base sheet 9. It will also be observed that the series of tab members may be arranged in different configurations to impart various types of flow patterns to the fluid passing through the collector. For example, in the embodiment of FIG. 5, the individual tab members 15 are arranged in end-to-end relationship to form a first sinuously shaped series of tab elements 16 in the manner described hereinabove. There is also provided a second series 19 of individual tab members 15 arranged in end-to-end relationship, with adjacent tab members being perpendicular to each other, such that series 19 is positioned in opposing relationship so that the spacing between the first and second series of tab members is non-constant. In other words, opposing tab elements 15 are substantially perpendicular to each other so that the spacing between these tab members varies from a maximum as the inlet edge 13 of panel 9 to a minimum at outlet edge 14 of panel 9. In this arrangement, as in the embodiment of FIG. 1–FIG. 3, adjacent tab members of each series are perpendicular to each other and non-contiguous, with the tab members being perpendicular to the base sheet 9 and arranged at angles of approximately 45° with respect to inlet edge 13.

Figure 5:
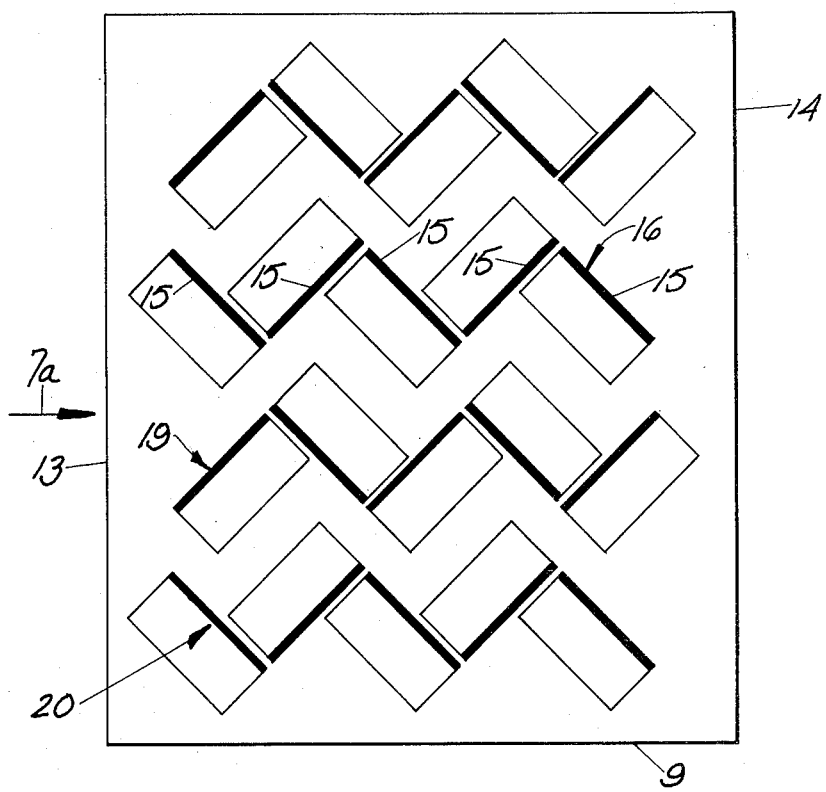
FIG. 5 is another embodiment illustrating an alternate tab member configuration.

If desired, a third series 20 of individual tab members 15 arranged in end-to-end relationship may be positioned in spaced relationship with second series 19 to form another air passageway between the sinuously-shaped series of tab members. In the embodiment of FIG. 5, series 20 is positioned such that the spacing between series 19 and 20 is non-constant. Additional series of tab elements may be added as required to form the necessary number of fluid passageways.

Another arrangement is illustrated in FIG. 6, where the sinuously shaped series 21 and 22 of adjoining individual tab elements 15 are of substantially constant spacing, and the outermost sinuously shaped series 23 and 24 of individual adjoining tab members 15 are arranged in constant spaced relationship. However, series 22 and 23 are so arranged that the spacing between these tab elements is non-constant, thereby forming three non-parallel fluid passageways extending between the inlet and outlet of the panel.

A further embodiment is illustrated in FIG. 7 where the outermost adjacent series 25 and 26, and 27 and 28, respectively, are arranged in non-constant spaced relationship, while the innermost adjoining series 26 and 27 are positioned in constant spaced relationship, thereby forming three non-parallel fluid passageways extending between the inlet and outlet of the panel.

In the embodiment of FIG. 8, all of the tab members 15 are parallel to each other and formed in four parallel series 29-32 of adjoining tab members to form three parallel spaced fluid passageways extending between the inlet and outlet of the panel. It will be observed that this arrangement lacks the sinuous shape of the previous embodiments, and may be used in constructions where minimal impedence to fluid flow is desired.

Finally, in the embodiment of FIG. 9, the individual tab members 15 are arranged randomly to provide a plurality of randomly positioned air passageways among the tab members.

As described above, solar radiation absorbing panels are known which require that continuously constructed vertically positioned fins be separately attached to the underlying base sheet in one or more separate fabrication steps to complete the panel. However, the solar radiation absorbing panel 1 of the present invention is constructed in such a way as to eliminate the separate fabrication steps required by conventional solar radiation absorbing panels.

In the present invention, the substantially flat plate-like base sheet 9 is severed along a plurality of C-shaped non-contiguous continuous lines 30 as illustrated in FIG. 2, leaving a portion 31 of the base sheet attached between the ends of each of the lines of severence 30 to form a fold or bend line. If desired, the fold line 31 may be scored or grooved to facilitate bending of the tab member. Each attached portion is then bent away from surface 10 of sheet 9 to form the plurality of upstanding rectangular-shaped tab members 15 and openings 32 of substantially the same size and shape as the tab members. It will be understood that members of different shapes such as semicircular, square, trapezoidal, etc., may be formed by properly arranged severence and bend lines. Furthermore, it will be observed that the tab members 15 may be rapidly and easily formed in this manner by a single stamping and bending operation where the tab members are formed simultaneously, or by separate or consecutive stamping and bending operations where some of the tab members are formed at one time and some of the tab members are formed at a different time.

As observed above, tab members 15 may be bent perpendicularly to surface 10 of sheet 9 as illustrated in FIG. 3, or may be bent to form angular relationships with the base sheet surface. It will be observed that this method of fabrication produces tab members 15 and openings 32 which are non-contiguous, thereby furnishing connecting areas or lands 33 between adjacent openings and tab members, as shown in FIG. 2. In order to provide sufficient structural rigidity to panel 1, it is preferred that the lands 33 between adjacent openings 32 and between adjacent tab members 15 is at least one eighth of the shortest dimension of the tab member or opening.

In order to enhance the absorptivity of panel 1, the surface 10, as well as the surfaces of tab members 15 may be provided with a coating 34 of black paint or other solar radiation absorption enhancing material.

In a preferred embodiment, means are provided in the form of a substantially flat plate-like support sheet 35 underlying base sheet 9 to cover openings 32 and prevent fluid flow therethrough. In addition, the portions of support sheet 35 coextensive with openings 32 may be provided with a solar radiation absorption enhancing coating 36 the same or different from coating 34. Alternatively, base sheet 9 or support sheet 35, or both, may themselves by constructed of a solar radiation absorbing material.

It will be understood that various changes in the details, materials, steps and arrangements of parts, which have been described and illustrated in order to explain the nature of the invention, may be made by those skilled in the art within the principle and scope of the invention as expressed in the appended claims.

The embodiments of the invention in which an exclusive property or privilege is claimed are as follows:

1. A solar radiation absorbing panel for use with a fluid heating solar collector of the type having a box-like enclosure dimensioned to accept said panel and including a cover overlying said panel transmissive to solar radiation, said panel comprising:

a substantially flat plate-like base sheet of solar radiation absorptive material having a substantially planar surface bounded by spaced side and end edges, said end edges forming the fluid inlet and outlet, respectively, of said panel; and means projecting away from said surface of said base sheet for forming at least one fluid passageway for directing fluid from said inlet to said outlet, said means including a plurality of individual tab members extending away from said surface of said base sheet, each of said tab members being formed by severing said sheet along a continuous line leaving a portion of said base sheet attached between the ends of said severed line and bending said tab member along said attached portion away from said surface leaving an opening in said base sheet, the spaces between some at least of said tab members forming said fluid passageways, each of said tab members including spaced edges extending away from said base sheet, said plurality of tab members comprising a first series of tab members arranged in end-to-end relationship extending generally between said inlet and outlet, and a second series of tab members arranged in end-to-end relationship spaced from said first series of tab members to form said passageway between said first and second series of tab members.

2. The panel according to claim 1 wherein some at least of said tab members are dimensioned to extend from said surface of said base sheet to slightly beneath the collector cover to limit fluid passing therebetween.

3. The panel according to claim 1 wherein some at least of said tab members are perpendicular to said surface of said base sheet.

4. The panel according to claim 1 wherein said tab members are rectangular.

5. The panel according to claim 1 wherein said tab members are of substantially the same size and shape.

6. The panel according to claim 1 wherein said tab members and said openings are of substantially the same size and shape.

7. The panel according to claim 1 wherein some at least of said tab members are oriented to lie along lines extending between said inlet edge and said outlet edge.

8. The panel according to claim 1 wherein some at least of said tab members are oriented to lie along lines extending between said inlet edge and one of said side edges.

9. The panel according to claim 1 wherein some at least of said tab members are arranged in spaced parallel relationship.

10. The panel according to claim 1 wherein said tab members are non-contiguous.

11. The panel according to claim 1 wherein said openings are non-contiguous.

12. The panel according to claim 1 wherein some at least of the tab members of said first series are parallel to some at least of the tab members of said second series.

13. The panel according to claim 1 wherein said tab members of said first series are parallel to each other and said tab members of said second series are parallel to each other.

14. The panel according to claim 1 wherein said first and second series of tab members are sinuously shaped.

15. The panel according to claim 14 wherein adjacent tab members of each series are perpendicular to each other.

16. The panel according to claim 14 wherein adjacent edges of said tab members are non-contiguous.

17. The panel according to claim 14 wherein said tab members are arranged substantially at angles of 45° with respect to said inlet edge.

18. The panel according to claim 14 wherein the spacing between said first and second series of tab members is substantially constant.

19. The panel according to claim 18 wherein the opposing tab members of each series are arranged in staggered relationship.

20. The panel according to claim 18 wherein said opposing tab members are staggered by approximately one half their length.

21. The panel according to claim 20 wherein adjacent tab members of each of said series are perpendicular to each other and non-contiguous, said tab members being perpendicular to said base sheet and substantially arranged at angles of 45° with respect to said inlet edge, said tab members being rectangular and of substantially the same size and shape as each other and as said openings.

22. The panel according to claim 14 wherein said first and second series of tab members are positioned in opposing relationship such that the spacing between said first and second series of tab members is non-constant.

23. The panel according to claim 22 wherein adjacent tab members of each of said series are perpendicular to each other and non-contiguous, said tab members being perpendicular to said base sheet and substantially arranged at angles of 45° with respect to said inlet edge, said tab members being rectangular and of substantially the same size and shape as each other and as said openings.

24. The panel according to claim 1 including a third series of tab members arranged in end-to-end relationship and positioned in spaced relationship with said second series of tab members.

25. The panel according to claim 24 wherein said third series of tab members is parallel to at least one of said first and second series of tab members.

26. The panel according to claim 25 wherein said first, second and third series of tab members are sinuously shaped.

27. The panel according to claim 26 wherein the spacing between said series of tab members is substantially constant.

28. The panel according to claim 26 wherein the spacing between adjacent series of tab members is non-constant.

29. The panel according to claim 26 wherein the spacing between one set of adjacent series of tab members is substantially constant and the spacing between the other set of adjacent series of tab members is non-constant.

30. The panel according to claim 1 wherein said tab members are rectangular and of substantially the same size and shape as each other and said openings, and wherein the spacing between adjacent openings and between adjacent tab members is at least one eighth of the shortest dimension of said tab member.

31. The panel according to claim 1 including means covering said openings to prevent fluid flow therethrough.

32. The panel according to claim 31 wherein said means comprises a substantially flat plate-like support sheet underlying said base sheet.

33. The panel according to claim 32 wherein the portion of said support sheet coextensive with said openings in said overlying base sheet is solar radiation absorbing.

34. The panel according to claim 1 including said enclosure and cover, said enclosure incorporating said panel and supporting said cover in overlying relationship with the tab member containing surface of said panel.

* * * * *